Jan. 1, 1963 R. C. ADAMS Re. 25,309

DISPLAY STAND BASE

Original Filed Sept. 8, 1959 3 Sheets-Sheet 1

INVENTOR.
RAYMOND C. ADAMS
BY
Porter, Chittick & Russell
ATTORNEYS

DISPLAY STAND BASE

Original Filed Sept. 8, 1959 3 Sheets-Sheet 2

INVENTOR.
RAYMOND C. ADAMS
BY
Porter, Chittick & Russell
ATTORNEYS

DISPLAY STAND BASE

Original Filed Sept. 8, 1959 3 Sheets-Sheet 3

INVENTOR.
RAYMOND C. ADAMS
BY
Porter, Chittick & Russell
ATTORNEYS

United States Patent Office

Re. 25,309
Reissued Jan. 1, 1963

25,309
DISPLAY STAND BASE

Raymond C. Adams, Framingham, Mass.
(807 Statler Bldg., Boston 16, Mass.)

Original No. 2,940,710, dated June 14, 1960, Ser. No. 838,594, Sept. 8, 1959. Application for reissue Dec. 11, 1961, Ser. No. 160,398
5 Claims. (Cl. 248—174)

Matter enclosed in heavy brackets [ ] appears in the original patent but forms no part of this reissue specification; matter printed in italics indicates the additions made by reissue.

This invention relates to display stands and more particularly to a display stand base formed of corrugated cardboard.

Display stands formed of cardboard have been made in various styles and constructions. The present invention is an improvement over display stands of the type consisting of a hollow rectangular base formed of a single sheet of corrugated cardboard and one or more separate display trays supported by the base. Heretofore, it has been common to make the base and trays collapsible. A rectangular base is generally collapsed by bringing two opposite walls together, with the other two walls shifting simultaneously from right angle to straight line positions relative to the first two walls. When fully collapsed, the base appears as a two-layer package, each layer consisting of two adjacent walls. Unfortunately, this is the extent to which the base can be collapsed; and, if it is of any appreciable size, it is bulky and awkward to handle, even when collapsed.

Accordingly, the object of this invention is to provide a hollow display stand base formed of corrugated cardboard which can be collapsed to a first flat package which then can be folded upon itself to form a second smaller package.

Other objects and many of the attendant advantages of this invention will be readily appreciated as the invention becomes better understood by reference to the following detailed description when considered in connection with the accompanying drawings, wherein.

Figure 1:
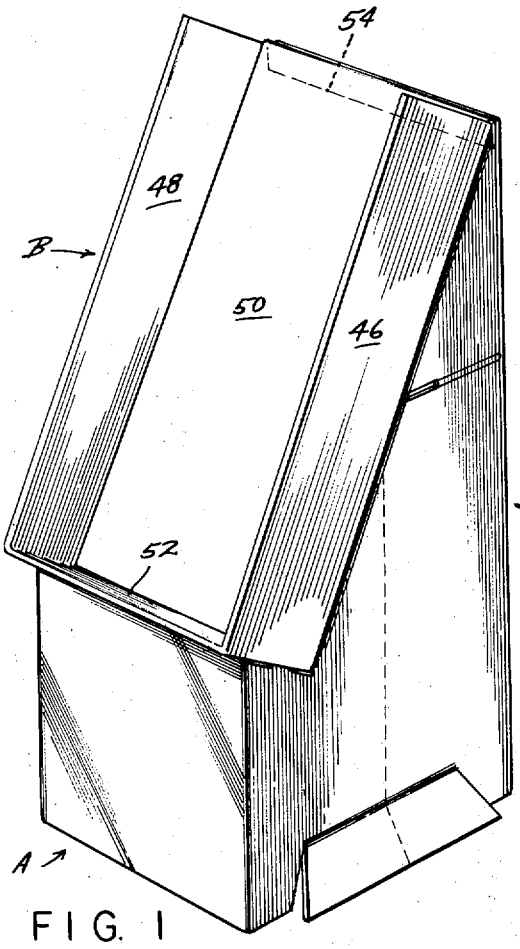
FIG. 1 is a perspective view of a display stand embodying the present invention and comprising a preferred form of hollow collapsible base and a tray supported by the base.
Figure 2:
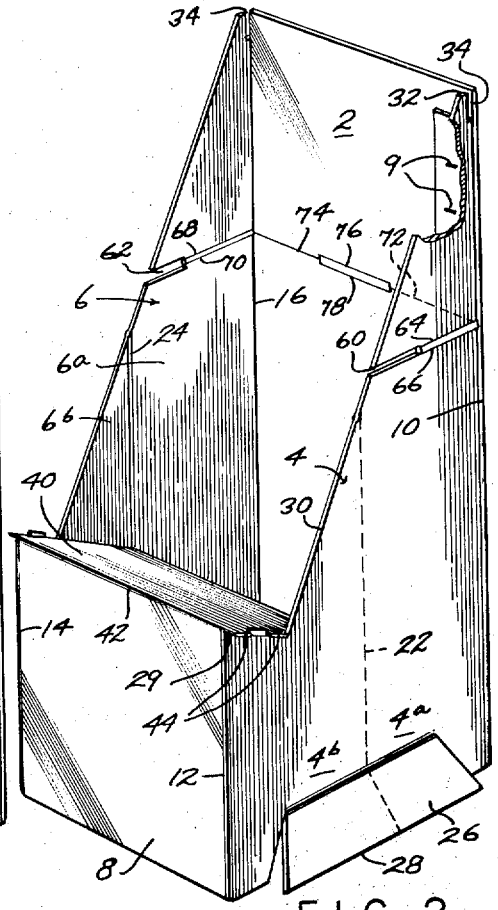
FIG. 2 is a view like FIG. 1, but with the tray removed.

Referring now to FIGS. 1 and 2, there is shown a display stand comprising a base A and a tray B supported by the base. The base is formed of a single sheet of corrugated cardboard stock which is bent to form a rear wall 2, side walls 4 and 6, and a front wall 8. The ends of the sheet are stapled together as at 9. Score lines at 10, 12, 14, and 16 (preferably on the inside surface of the cardboard) facilitates bending to form the aforementioned walls. At corresponding points between rear wall 2 and front wall 8, the inner surfaces of side walls 4 and 6 are provided with vertical score lines 22 and 24 respectively which permit them to be folded upon themselves. For convenience, wall 4 is considered as comprising a rear portion 4a and a forward portion 4b demarcated by score line 22. Corresponding portions of wall 6 are identified as 6a and 6b respectively.

At its bottom end, side wall 4 is slit and scored to form a flap 26. When flap 26 is flush with side wall 4, its bottom edge 28 extends below the bottom edge of side wall 4. When placing the stand upright on a floor, flap 26 is bent outwardly as shown to allow the bottom edge of side wall 4 to rest on the floor. In its outward position, flap 26 acts against the supporting floor to stabilize the stand so that it will not fall over sidewise and also to prevent the stand from sliding on the floor. Although not shown, it is to be understood that side wall 6 has a flap corresponding to flap 26.

Side walls 4 and 6 are not rectangular but are cut back to form irregular top edges, each comprising a short forward portion 29 that extends rearwardly and downwardly, a long intermediate portion 30 that extends rearwardly and upwardly, and a short rear portion 32 that extends horizontally and is terminated short of rear wall 2 by a vertical slot 34. Front wall 8 is provided with a top flap 40 demarcated by a score line 42 and bent back between side walls 4 and 6. The opposite side edges of flap 40 are provided with tabs 44 that engage top edge portions 28 and thereby prevent the flap from falling down to a position where it can no longer prevent sides 4 and 6 from folding on themselves along score lines 22 and 24. The top edge of front wall 8 and edge portions 29 and 30 support tray B in an inclined article-displaying position (see FIG. 1). Flap 40 also helps support tray B, acting as a form of shelf for the tray.

Tray B is shown as having two side walls 46 and 48, a bottom wall 50, and a lower end wall 52. An upper end wall may be provided, but it is not necessary. Tray B is provided with a flap 54 on its underside adjacent its upper end. Flap 54 fits into slots 34 and functions to lock the tray to the base in such a manner as to keep the tray from tipping forward on the base.

As seen in FIG. 2, the rear portions 4a and 6a of side walls 4 and 6 are formed with horizontal slots 60 and 62 respectively. Slots 60 and 62 commence at edge 30 and terminate short of rear wall 2. The width, i.e., vertical dimension, of slots 60 and 62 is approximately the same and preferably slightly larger than twice the thickness of the sheet stock. Formed on the outside surface of side wall 4 and extending from slot 60 to rear wall 2 are two parallel horizontal score lines 64 and 66. Side wall 6 has an identical pair of score lines 68 and 70. Rear wall 2 has two aligned slits 72 and 74 which commence at side walls 4 and 6 and terminate short of each other. The inside surface of rear wall 2 has a pair of parallel score lines 76 and 78 which extend between the adjacent ends of slits 72 and 74.

Figure 3:
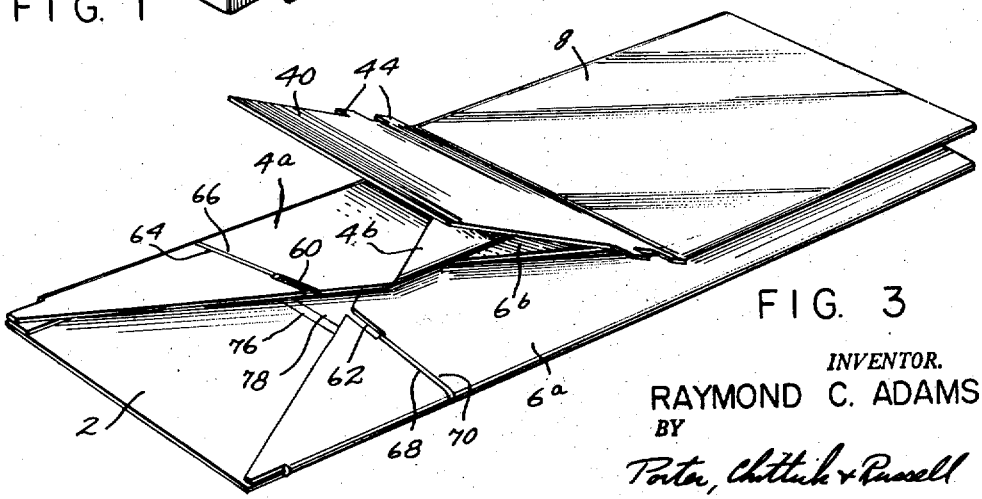
FIG. 3 is a perspective view showing how the base is collapsed to a flat package.
Figure 4:
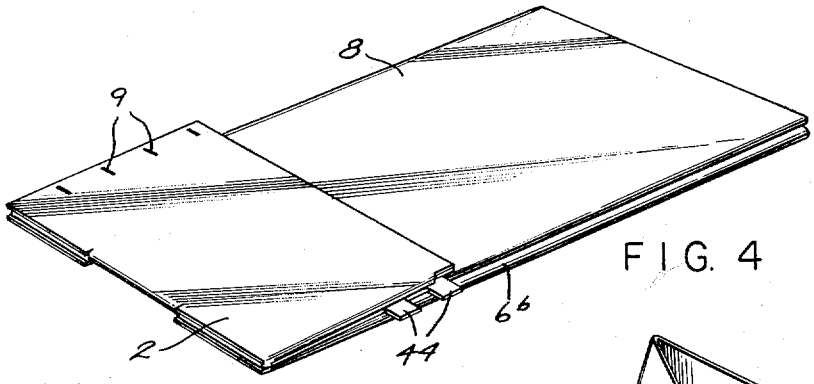
FIG. 4 is a perspective view illustrating how the flat package of FIG. 3 is folded to form still a smaller package.
Figure 5:
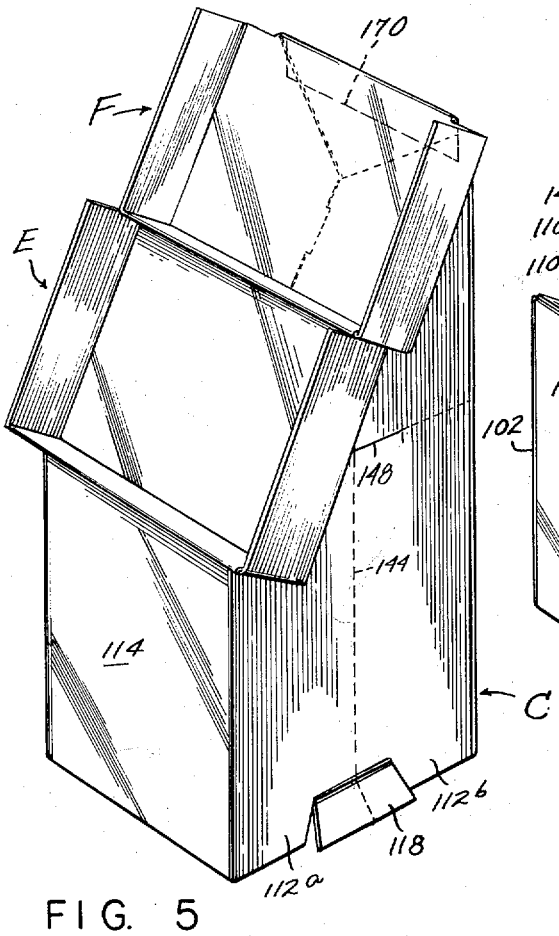
FIG. 5 is a perspective view like FIG. 1 but showing a second form of collapsible and foldable base supporting two display trays.

Referring now to FIGS. 3 and 4, base A is collapsed and folded in the following manner: Flap 40 is folded upwardly out from between side walls 4 and 6. Then side walls 4 and 6 are folded upon themselves, placing rear wall 2, the side walls 4 and 6, and front wall 8 in successively contacting and substantially parallel relationship. Either rear portion 3a or rear portion 6a may be immediately next to rear wall 2. Then the rear wall 2 and the side wall portions 4a and 6a are folded down and frontward so that the top end of rear wall 2 is positioned in front of and hides the upper ends of side wall portions 4a and 6a (FIG. 4). It is to be noted that the top ends of rear wall 2 and side wall portions 4a and 4b will fold forwardly but not rearwardly because of the disposition of the horizontal slots 60, 62, score lines 64—70, slits 72, 74, and score lines 76, 78.

When side walls 4 and 6 are folded upon themselves so as to lie close to rear wall 2, the score lines 64 and 66 will be directly in front of slit 72 and score lines 68 and 70 will be directly in front of slit 74. Similarly, slots 60 and 62 will be in front of score lines 76 and 78. It is to be noted that score lines 64 and 66 are as long as slit 72 and that slot 60 is no longer than score lines 76 and 78. Similarly, score lines 68 and 70 are equal in length to slit 74, and slot 62 is no longer than score lines 76 and 78. The net result is that substantially everywhere along the line of bending the top ends of rear wall 2 and side walls 4 and 6, the thickness of material that is actually bent is the thickness of a single wall. Bending a single layer of corrugated cardboard is readily accomplished, whereas bending several layers simultaneously along a given line is not readily accomplished since the outside layer (the convex side of the bending curvature) is subjected to a greater stretching or tearing stress than the next adjacent layer. However, if at a given point along the bending line each of the layers but one is slit, then only one layer is actually bent; the others separate at that point. In order to keep the layers in single pieces and to avoid need for hinges, the successive layers are slit at different points along the bending line, with only one layer actually unslit at each given point.

FIGS. 5–8 illustrate a second form of the invention which features rearward instead of forward folding. It comprises a base C and two trays E and F. The second form of the invention is also constructed of a single sheet of corrugated cardboard stock which is scored at 100, 102, 104, and 106 to facilitate bending into a rectangular base comprising a rear wall 108, side walls 110 and 112, and a front wall 114. The ends of the sheet are stapled together by staples 117 and 116. The side walls are formed with flaps 118 at their bottom ends. Flaps 118 are like flaps 26.

The side walls are substantially identical in outline, each having an irregular top edge comprising a first rearwardly and downwardly extending top edge portion 120, a first rearwardly and upwardly extending portion 122, a second rearwardly and downwardly extending portion 124, and a second rearwardly and upwardly extending portion 126. Formed integral with side walls 110 and 112 at the edge portions 126 are flaps 130 and 132. Flap 130 has a tab 134 and flap 132 has a slit 136. With tab 134 inserted in slit 136, the two flaps are locked together and act to keep side walls 110 and 112 in parallel relation. When flaps 130 and 132 are unlocked from each other, they can be swung forward and outward into coplanar relation with side walls 110 and 112. Another flap 140 is attached to the top edge of front wall 114. Flap 140 also prevents side walls 110 and 112 from collapsing inward.

A vertical score line 142 facilitates bending side wall 110 back on itself to form fore and aft portions 110a and 110b respectively. A corresponding score line 144 divides side wall 112 into fore and aft portions 112a and 112b respectively. At the upper ends of score lines 142 and 144, side walls 110 and 112 are provided with horizontal slits 146 and 148. These slits terminate short of rear wall 108. Extending between slit 146 and rear wall 108 are two score lines 150 and 152. Score line 150 is at substantially the same level as slit 146. Two corresponding score lines 154 and 156 extend between slit 148 and rear wall 108. Preferably, score lines 150—156 are inscribed on the inside surfaces of the side walls.

Rear wall 108 has two horizontal slots 158 and 160 extending inward from its side edges at substantially the same level and for substantially the same distance as score lines 150 and 152. Extending between slots 158 and 160 and preferably formed in the rear surface of rear wall 108 are horizontal score lines 162 and 164 which are spaced from each other by an amount equal approximately to the thickness of the cardboard stock.

Figure 6:
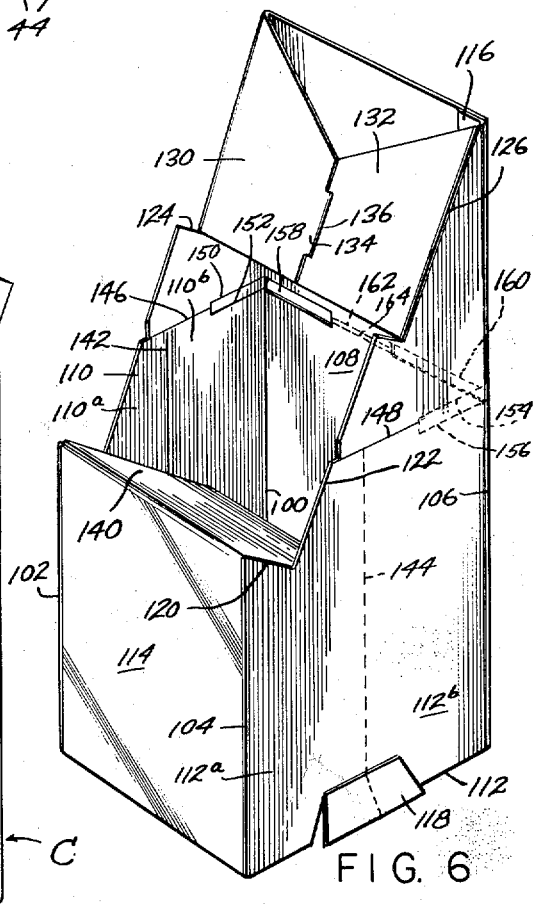
FIG. 6 is a view like FIG. 5, but with the trays removed.
Figure 7:
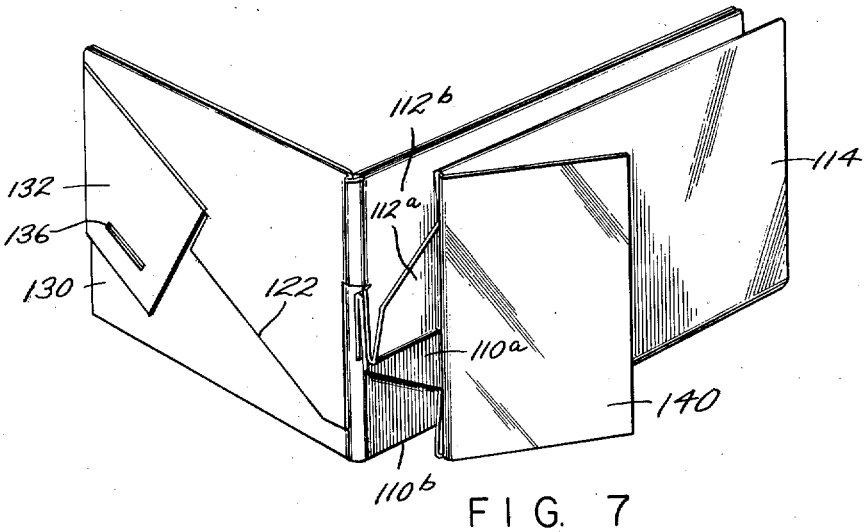
FIG. 7 is a perspective view showing how the base of FIGS. 5 and 6 is collapsed and folded.
Figure 8:
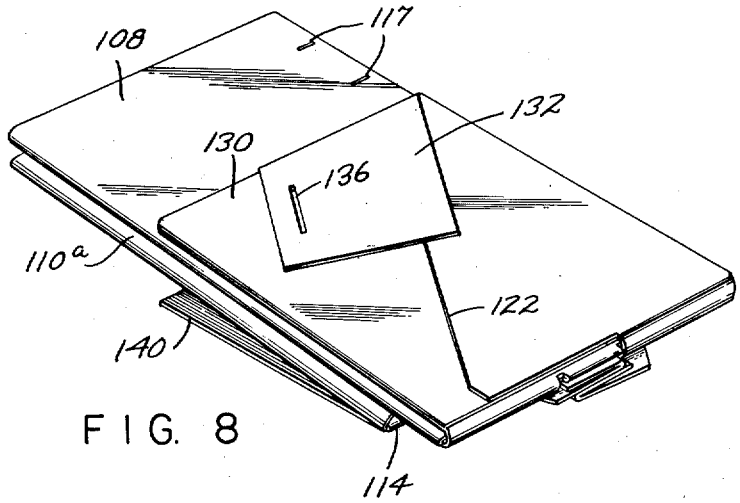
FIG. 8 is a perspective view showing the same base in fully folded condition.

When assembled, the base of FIG. 6 accommodates two trays E and F. Tray E rests on the top edge of front wall 114 and side edge portions 120 and 122. Tray F is supported by edge portions 124 and 126. Preferably, tray F has a rear flap 170 which is inserted between rear wall 108 and flaps 130, 132 so as to prevent the tray from being knocked off the base accidentally.

This form of base is collapsed by disconnecting flaps 130 and 132, pulling flap 140 out from between the side walls, and folding the side walls back on themselves accordion-wise. Flap 140 is bent over in front of front wall 114. Then the side walls and the rear walls are folded rearwardly and downwardly along the bending line provided by score lines 162 and 164 and slots 158 and 160. Rearward bending is made possible by forming the wide slots in the rear wall instead of the side walls as in the preferred embodiment.

As used herein, the term "corrugated cardboard" denotes sheet stock comprising two outer layers of paper secured to an inside layer of paper which is corrugated, i.e., shaped into straight, parallel, and regularly curved ridges and hollows.

Obviously, many modifications and variations of the invention are possible in the light of the foregoing teachings. It is to be understood, therefore, that the invention is not limited in its application to the details of construction and arrangement of parts specifically described or illustrated, and that within the scope of the appended claims, it may be practiced otherwise than as specifically described or illustrated.

I claim:

1. A collapsible and foldable display stand base constructed of corrugated multi-ply paper stock, said base comprising a vertical rear wall, a pair of vertical side walls [having inclined top edges], and a vertical front wall, [said rear wall extending to a greater height than said front wall,] said side walls foldable inwardly upon themselves whereby said front and rear walls may be brought toward each other accordion-wise, means attached to said front wall and positionable between said side walls to prevent folding of said side walls, said rear wall having two horizontal cuts at a predetermined level intermediate its upper and lower ends, said cuts commencing at the opposite side edges and extending toward but terminating short of each other by a predetermined amount, said side walls each having a horizontal cut at substantailly said same predetermined level, said side wall cuts [beginning at said inclined top edges and] extending toward but terminating short of said rear wall by an amount equal approximately to the length of the horizontal cuts in said rear wall, whereby when said side walls are folded inwardly said cuts in said side and rear walls are disposed in series relation to provide a line of weakness along which said rear and side walls are readily foldable into a compact package.

2. A collapsible and foldable display stand base as defined by claim 1 wherein said cuts in said side walls have a greater width than said cuts in said rear wall, whereby said side and rear walls are foldable downwardly and forwardly along said line of weakness.

3. A collapsible and foldable display stand base as defined by claim 1 wherein said cuts in said rear wall have a greater width than said cuts in said side walls, whereby said rear and side walls are foldable downwardly and rearwardly along said line of weakness.

4. A collapsible merchandise display stand base formed of a single sheet of corrugated paper stock, said base comprising a rear wall having opposite side edges, two side walls each having a rear edge hinged to a different one of said side edges, and a front wall hinged to front edges of said side walls, said rear wall having two cuts extending inward from its side edges and terminating short of the center line of said rear wall, whereby said rear wall is divided into upper and lower portions connected by a tab portion, each of said side walls also having a cut [extending rearwardly from its front edge and] terminating at a point short of its rear edge by an amount equal to the length of said rear wall cut, said each side wall scored from said point to its rear edge whereby to divide said each side wall into upper and lower hinged portions, said side walls scored vertically for folding back on themselves whereby said front and rear walls may be moved toward each other to collapse said base accordion-wise, said rear wall cuts and said side wall cuts all located at approximately the same level whereby when said base is collapsed said upper portions may be swung down into substantially parallel relation with said lower portions.

5. A collapsible hollow base for a merchandise display stand, said base formed of a single sheet of corrugated paper stock, said base comprising a rear vertical wall having opposite side edges, two side walls each having front and rear edges, said rear edges hinged to the adjacent side edges of said rear wall, and a front wall having opposite side edges hinged to the adjacent front edges of said side walls, said side walls foldable along predetermined vertical lines whereby said front and rear walls may be brought together accordion-wise, said rear wall having two longitudinally aligned horizontal cuts dividing said rear wall into an upper section and a lower section, said slits extending inwardly of said side edges but terminating short of each other whereby said upper and lower sections are connected together by an intermediate hinge portion, said side walls scored along a horizontal line extending forwardly from said rear edges for a distance approximately equal to the length of said rear wall cuts, whereby said side walls are foldable into upper and lower side wall sections.

References Cited in the file of this patent or the original patent

UNITED STATES PATENTS

| | | |
|---|---|---|
| 1,729,014 | Scherotto | Sept. 24, 1929 |
| 1,771,760 | MacLellan | July 29, 1930 |
| 2,041,751 | Folsom et al. | May 26, 1936 |
| 2,123,290 | Powers | July 12, 1938 |
| 2,713,984 | Paige | July 26, 1955 |